(12) United States Patent
Lindo et al.

(10) Patent No.: US 9,268,935 B2
(45) Date of Patent: Feb. 23, 2016

(54) SMART CONTAINERIZATION OF MOBILE COMPUTING DEVICE RESOURCES

(71) Applicants: Jonathan Lindo, Santa Clara, CA (US); Vamsee Lakamsani, Livermore, CA (US); Vikas Krishna, San Jose, CA (US); Nagi Prabhu, Saratoga, CA (US)

(72) Inventors: Jonathan Lindo, Santa Clara, CA (US); Vamsee Lakamsani, Livermore, CA (US); Vikas Krishna, San Jose, CA (US); Nagi Prabhu, Saratoga, CA (US)

(73) Assignee: CA, Inc., New York, NY (US)

( * ) Notice: Subject to any disclaimer, the term of this patent is extended or adjusted under 35 U.S.C. 154(b) by 25 days.

(21) Appl. No.: 14/283,697

(22) Filed: May 21, 2014

(65) Prior Publication Data

US 2015/0242629 A1    Aug. 27, 2015

Related U.S. Application Data

(60) Provisional application No. 61/943,850, filed on Feb. 24, 2014.

(51) Int. Cl.
| | | |
|---|---|---|
| *G06F 21/00* | (2013.01) | |
| *G06F 21/53* | (2013.01) | |
| *G06F 21/57* | (2013.01) | |
| *G06F 21/62* | (2013.01) | |

(52) U.S. Cl.
CPC .............. *G06F 21/53* (2013.01); *G06F 21/577* (2013.01); *G06F 21/6236* (2013.01)

(58) Field of Classification Search
USPC ............................................................ 726/1
See application file for complete search history.

(56) References Cited

U.S. PATENT DOCUMENTS

| | | | | |
|---|---|---|---|---|
| 8,959,633 | B1* | 2/2015 | Dokey | G06F 21/50 705/30 |
| 2015/0074801 | A1* | 3/2015 | Koizumi | G06F 21/57 726/22 |
| 2015/0113284 | A1* | 4/2015 | Hong | G06F 21/51 713/187 |
| 2015/0193239 | A1* | 7/2015 | Dolph | G06F 9/4401 713/100 |

OTHER PUBLICATIONS

Tangoe, Inc., "Mobile Device Managment: Smart device Solutions for a Mobile World," available at: http://www.tangoe.com/Solutions/Rule-Mobility.aspx.

* cited by examiner

*Primary Examiner* — Jason Lee
(74) *Attorney, Agent, or Firm* — Baker Botts L.L.P.

(57) ABSTRACT

A method includes monitoring metrics at a mobile computing device. A substantive change in operating conditions is identified, based upon the monitored metrics. In response to the substantive change in the operating conditions, a smart container is automatically applied to a particular resource of the computing device. The smart container may define an enhanced security access policy. In accordance with a particular embodiment of the disclosure, the enhanced security access policy increases the level of protection to the resource.

12 Claims, 3 Drawing Sheets

SMART CONTAINERIZATION OF MOBILE COMPUTING DEVICE RESOURCES

CROSS-REFERENCE TO RELATED APPLICATION

This application claims the benefit of U.S. Provisional Application No. 61/943,850, filed Feb. 24, 2014, the disclosure of which is incorporated herein by reference.

BACKGROUND

The disclosure relates generally to access control to mobile device resources, and more specifically, to a system and method for smart containerization of mobile computing device resources.

SUMMARY

According to one embodiment of the disclosure, a method includes monitoring metrics at a mobile computing device. A substantive change in operating conditions is identified, based upon the monitored metrics. In response to the substantive change in the operating conditions, a smart container is automatically applied to a particular resource of the computing device. The smart container may define an enhanced security access policy. In accordance with a particular embodiment of the disclosure, the enhanced security access policy increases the level of protection to the resource.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

Figure 1:
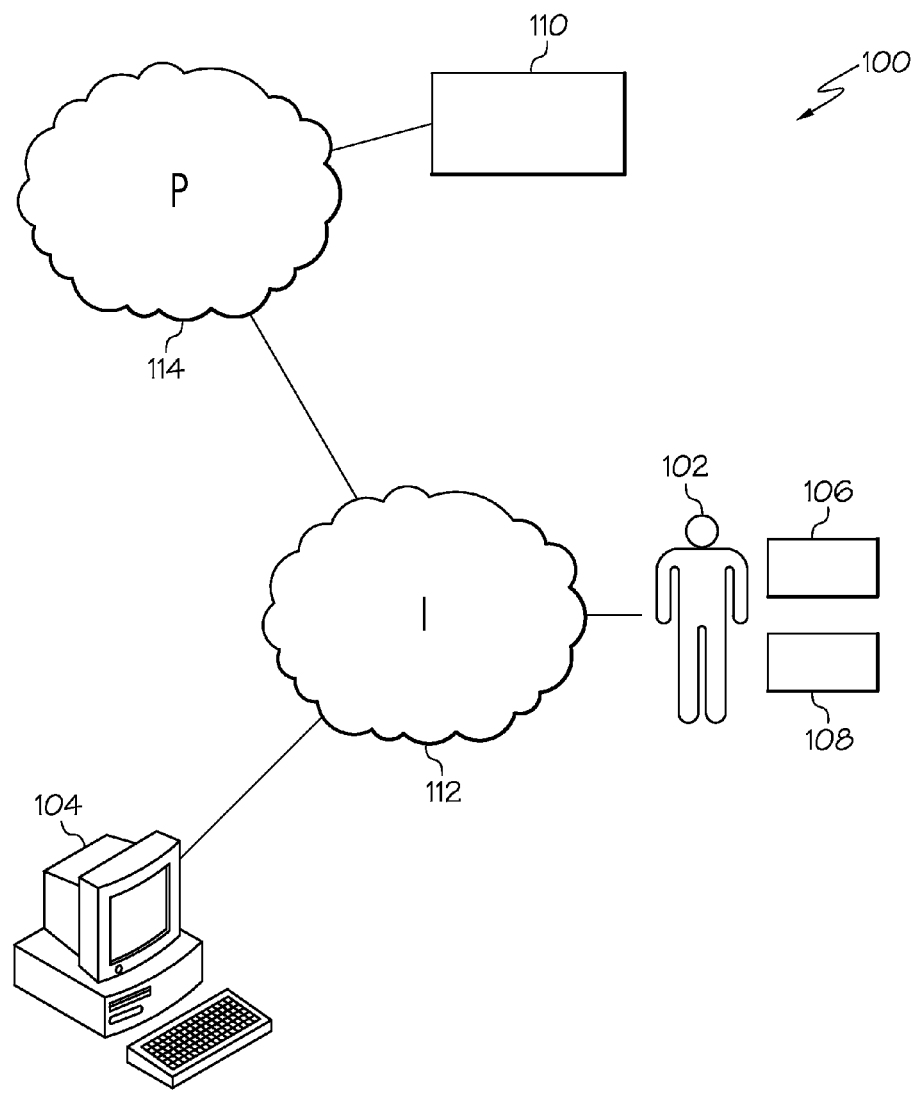
FIG. 1 illustrates a block diagram of a system for smart containerization of mobile computing device resources, in accordance with a particular embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, "memory" or a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring to FIG. 1, a network 100 that incorporates aspects of the present disclosure is illustrated. A user of network 100 has a wide variety of devices, applications, and services that are available to be leveraged. For example, user 102 will have an array of computing resources available for use. User 102 may have a personal computer (PC) 104 or other data handling system at a first location available for use at a first location (e.g., the user's residence or business location). The user may also have mobile devices 106 and 108 with network connectivity that allow the user to leverage the network from remote locations. Mobile devices 106 and 108 may include any mobile computing device including a mobile telephone, smart phone, tablet PC, laptop or other personal electronic device that allows the user to communicate using network 100.

User 102 may also be associated with an enterprise 110, for example, enterprise 110 may be the employer of user 102. Thus, enterprise 110 may make network computing resources available to user 102, for example, network storage, computer processing power, and network communication bandwidth. Accordingly, enterprise 110 comprises memory, processors, interfaces, devices, computers, servers, gateways and other components typically employed to provide such resources to its employees and other users of its network.

Network 100 may comprise any number of public, private or hybrid networks that can be accessed by user 102. For example, in the illustrated embodiment, network 100 includes a public network 112 (e.g., the Internet), and a private network 114 that is associated with enterprise 110. Each of networks 112 and 114 may include any number of additional public, private and hybrid networks.

Mobile devices 106 and 108 provide user 102 with access to any number of remote devices, applications, and services available over networks 112 and 114. Accordingly, a typical user will often create, compile or otherwise have access to several storage repositories that may include documents that user 102 would like to maintain access to. For purposes of this specification, document simply refers to any compilation of stored electronic data that is viewable and/or accessible by user 102. Documents may include word processing generated documents, web pages, emails, .pdfs, database/store records, software code management or revision stores, wiki entries, stored photograph images and any other type of electronic data that a user would like to store in order to view or otherwise access in the future.

In the illustrated embodiment, it is likely that user 102 has documents stored on the user's PC 104, mobile devices 106 and 108, and various resources made available by enterprise 110 (servers, computers and other network resources, in addition to resources not provided by enterprise 110, e.g., cloud storage via network 100). Enterprise 110 may offer user 102 certain resources shared with other employees of the enterprise (e.g., SharePoint) and may offer user 102 its own private resources. User 102 also has access to many publicly available resources where documents may be stored, for example the Internet (e.g., World Wide Web, FTP sites, non-HTML web pages, etc.), and other devices and services made available by a third party "in the cloud." Documents available in the cloud may include documents available by third party providers including Gmail or Google Documents/Drive, Microsoft Office 365, Box, Microsoft SkyDrive and Dropbox where user 102 may generate and/or store documents. Documents available to be associated with user 102 in the Internet are practically limitless.

Accordingly, the introduction of mobile computing devices has enabled pervasive access to documents, content, data and applications from anywhere on the planet, from a multitude of devices at any time of day or night. Some of the resources that are available to the user are personal in nature and at the complete control of the user. However, other resources are made available to the user by an enterprise, e.g., the user's employer. As such, enterprises face new challenges involving how to secure, manage and control access to corporate resources. The issues are compounded due to the fact that employees and other users are unwilling to give up complete control of personal mobile computing devices, and resist ceding too much control of mobile computing devices that are issued to the user by the enterprise. More and more, enterprises and users are engaging in a "bring your own device" (BYOD) philosophy that will allow a user access to all of the resources of the enterprise using a device that is owned, and at least partially controlled by the user.

Enterprises typically require the ability to exercise some level of control to prevent an error (or intentional act) by the employee to expose the enterprise to a security and/or data breach from a third party. Such a breach could occur from a mobile device being lost or stolen. However, such a breach could also occur from a user's failure to maintain certain protections (e.g., security and access control programs) on the mobile device. Such a breach may also occur if the user were to inadvertently (or intentionally) download malware or any type of software intended to breach security or confidentiality of the mobile device, the user, or the enterprise.

Various solutions have appeared on the market to address different aspects of the problems and issues that arise due to the above issues. However, as described herein, a new and different approach is beneficial to unify the ability to secure, manage and control the collection of apps, content, email and data on the device.

As enterprises rapidly evolve to take advantage of the benefits of mobility to create competitive advantages, security, safety and management challenges have arisen which threaten their success. Enterprises must implement solutions to manage corporate data accessed via mobile devices. Specifically, the increasing adoption of BYOD policies requires a solution to manage access to digital corporate assets from devices that may be corporate-owned or personal devices. Implementing a comprehensive strategy that addresses applications, devices and data is important for many modern enterprise companies, in order to allow employees to continue to leverage mobile devices, even as threats of external breaches grow exponentially.

The teachings of the present disclosure provide a comprehensive solution that allows for the definition of intelligent or "smart" containers around any particular resource element, such as an application, app, document, piece of content, email or data, which may be accessed from a mobile computing device. The resource may be located locally (on the mobile device), remotely (away from the mobile device) or the resource may be a compilation of local and remote data, hardware and/or software.

With this approach, enterprises (e.g., organizations) can define common policies for access to any resource, such as applications, apps, content, email or data that can be applied regardless of the device or application being used to access the resource in question.

Figure 2:
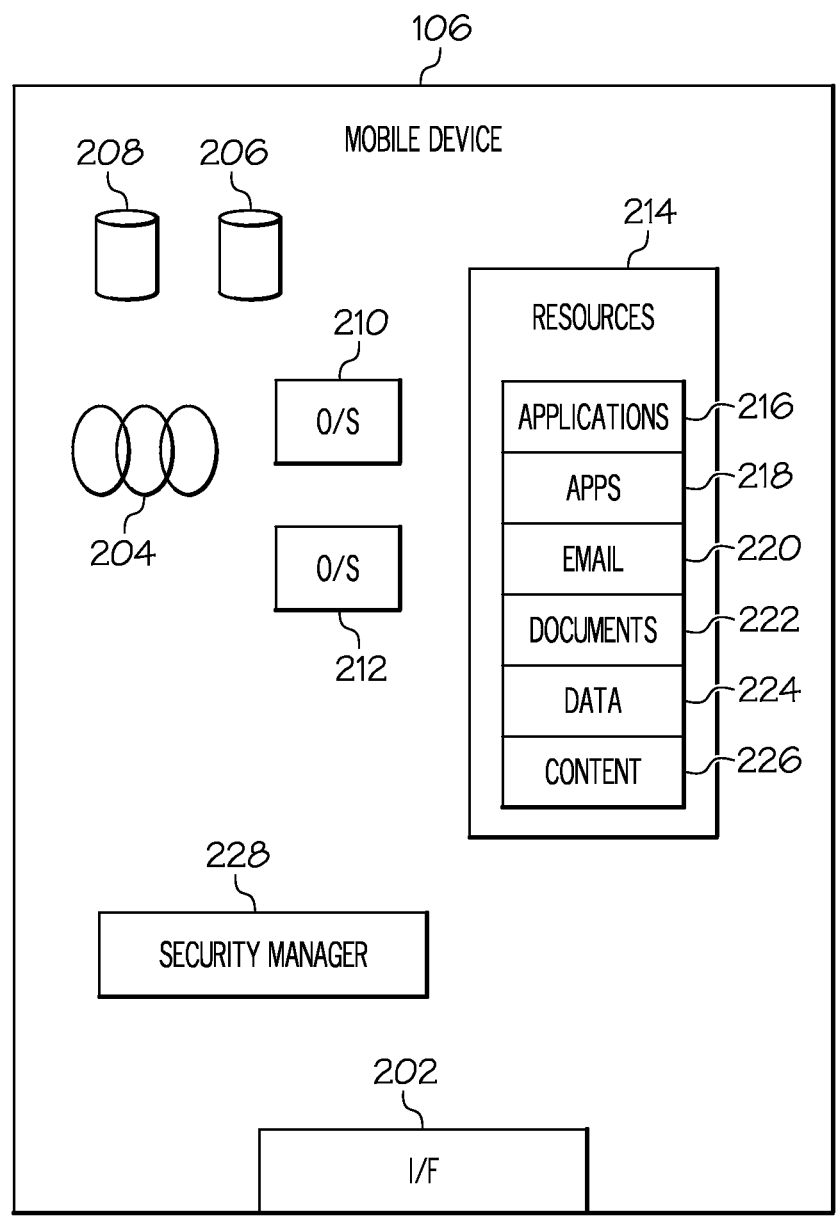
FIG. 2 illustrates a mobile computing device having particular local resources, in accordance with a particular embodiment of the present disclosure.

FIG. 2 illustrates mobile device 106 in more detail. As illustrated, a typical mobile device will include computing resources such as an interface 202, processors 204 and memory 206 and 208. Interface 202 may be a physical device and/or software construct. In addition, memory 206 and 208 may be one single memory or two discrete memories. The device will also have at least one operating system 210 that is utilized to operate the device. However, more and more mobile devices are allowing for at least one additional operating system 212, to allow the mobile device with more flexibility in the types of local and remote resources that the mobile device has access to.

A user of mobile device 106 may have access to any number of resources 214, including local or remote resources, or resources that employ a combination of local and remote resources to provide functionality to mobile device 106 and/or services to user 102. For example, in the illustrated embodiment of FIG. 2, mobile device 106 includes applications 216, apps 218, email 220, documents 222, data 224 and content 226. Any one or a combination of these resources may be made available to the user. However, these resources are listed as examples only, and in alternative embodiments, mobile device 106 may provide user 102 with access to any number or type of local, remote or hybrid (local and remote) resources.

Mobile device 106 also includes a security manager 228 that applies security, safety and access management to mobile device 106 and the remote and local resources to which mobile device 106 has access. In accordance with particular embodiments of the present disclosure, security manager 228 may be configured to manage and control access using various access controls, including user identity, location, time and/or date, network or IP address, multi-factor authentication, device signature, fingerprint, etc.

There are many ways to employ access control regarding the mechanisms described above. In an embodiment, any or all of the above mechanisms may be used to control access to the entire mobile device. For example, prior to using the mobile device for any purpose, a user may have to successfully navigate one or more of the access mechanisms described above. Another technique is to segregate components of the mobile device based upon the intended use. For example, a device may be divided among "personal" resources and enterprise resources, so that the enterprise may exercise control over the user's access to enterprise resources without impacting the user's personal resources. In the illustrated example, mobile device 106 includes two independent repositories of memory that can be segregated. Moreover, two separate operating systems may be available on the mobile device.

In order to allow for seamless access, use, management and operation of any particular resource, in accordance with the teachings of the present disclosure, digital, secure, "smart" containers are placed around any resource that the enterprise, network administrator or user wish to control or protect. This enables a resource, for example an application, document or email, to be encapsulated within a security envelope in which the resource is protected via strong encryption and an active security engine. This security envelope, and therefore the smart container, can define an access control policy, which can be enforced during an application execution, or during the process of making the containerized resource, or making document available for viewing, editing or sharing.

The "consumer" of these resources, such as the operating system 210, will view these "containerized" resources as normal resources, similar to any other non-containerized resource. Thus, among other things, the teachings of the present disclosure allow for the simulation of a specific resource type to the operating system for the purposes of allowing systems to interact with "smart" containerized resources as though they were regular resources (with no smart containers present).

In order to protect a specific resource, for example a third party application, one solution provides for a specialized interface in order to allow a third party (e.g., the enterprise) to specifically control access to the application. In the past, this has often required that third party commercial applications be modified to allow for this specialized communication. The smart containers of the present disclosure allow interaction between the operating system and the resource to proceed in the ordinary manner, such that the smart container is entirely transparent to the operating system and no additional modifications of the resource or the operating system are required.

In accordance with the teachings of the present disclosure, security manager 228 may employ one or more of various access control policies. Security manager 228 may be embedded in each smart container associated with the mobile device, or the security manager may be used to centrally manage multiple or all smart containers on a mobile device.

Access control policies can define predetermined requirements which include user identity, geo-location fencing (allow access only from certain geographies), time-fencing (allow access only during certain days or times of day), network-fencing (allow access only from certain networks or types of networks), authentication requirements which may include multi-factor authentication, type or ID of the device attempting access, proximity of a hardware key or security token, enhanced password requirement, etc. Moreover, the teachings of the present disclosure allow for the definition of a "smart" container policy and the common application of said policy generally across any digital resource on the mobile device.

Security manager 228 of the present disclosure allows for real-time and intelligent decision making and policy setting. For example, security manager 228 can monitor, store and analyze various metrics in order to apply heuristics and analysis on a mobile computing device, and thereby modify or replace the security access policy in place for a given resource, based upon these metrics. Some of these metrics may include application digital signature, network activity, amount of data sent and/or received, location, device IP address and network, level of certainty of user identity based upon authentication level, etc. Thus, the collection of device data, signature and fingerprinting information allow security manager 228 to uniquely identify a user or end-point for the purposes of applying the "smart" container policies. In one embodiment, security manager 228 does not rely upon predetermined conditions to determine when to change or enhance access control policies. Instead, security manager 228 is configured to receive and analyze metrics and changing operating conditions, in order to determine when a change in access control policies is appropriate or warranted.

Thus, the solution described within the present disclosure does not require explicit definition of access control policies for each resource on the mobile computing device. Instead, security manager 228 applies intelligent analysis to automate the application of access control policies, based upon conditions and metrics at any given time, in real-time and automatically (without user intervention).

The teachings of the present disclosure further provide a system and method that restricts access via strong encryption of mobile resources such as apps, documents, email, or data via a digital encapsulation technique which provides an appearance and common system access to the resource for the purposes of executing, reading or writing to or from the resource.

Figure 3:
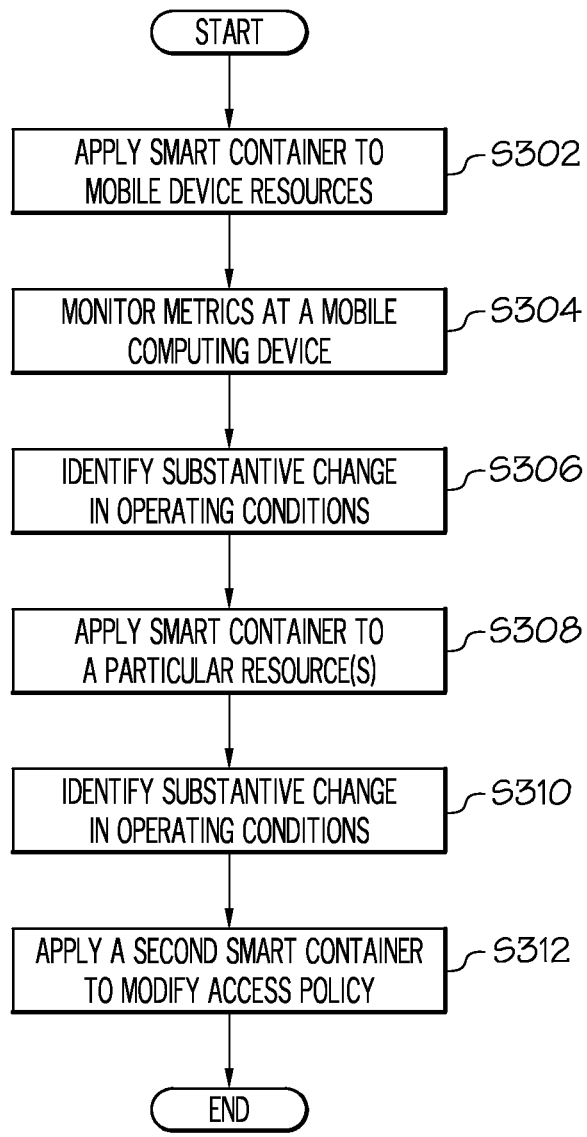
FIG. 3 illustrates a method for smart containerization of mobile computing device resources, in accordance with a particular embodiment of the present disclosure.

FIG. 3 illustrates a method for smart containerization of mobile computing device resources, in accordance with a particular embodiment of the present disclosure. The method 300 begins at step 302 where a smart container is applied to one or more resources of a mobile device. In particular embodiments, a smart container is software code that is injected into the resource in order to form a container around the resource. The smart container allows for the administration of security or access control policies to be applied to the resource that deviate from policies that may have been embedded in the resource by the third party that developed the resource (developer), and/or deviate from the policies that may apply more generally to the mobile phone itself. The security or access control policies may partially supplant, or may completely supplant, the policies embedded in the resource by the third party and/or policies that apply generally to the mobile phone itself. The smart container allows for individualized control and policy setting related to a particular resource. Moreover, the smart container will be transparent to the operating system. In other words, other than the injection of the smart container, no other software modifications of the resource or the operating system are required in order for the resource to continue to function and interact with the operating system, although the resource and access thereto, are now under the control of the smart container as well.

Smart containers of the present invention are generic in nature, meaning they can be applied to a wide array of resources that were developed by a wide range of third party developers. This allows for the automatic roll-out of smart containers as circumstances change on the mobile device (e.g., metrics change). This also allows for smart containers to be easily modified or even to modify themselves in response to such changing conditions and/or metrics.

The teachings of the present disclosure also allow for the ease of roll-out of the smart container to a resource without having to modify either the smart container or the resource in order for the two to co-exist and function together in the mobile device. After the smart container is applied to the resource, no communication, interaction, or access can be made to or from the resource without the "approval" or authorization from the smart container.

The method continues at step 304, where metrics are monitored at, for example, a mobile computing device or other suitable device. The metrics that are monitored include, but are not limited to user identity, location, time, date, network address (e.g., IP address) of the mobile device or any network component or resource that the mobile device is attempting to access, multi-factor authentication, device signature, fingerprint, resource digital signature (e.g., application digital signature of an application being accessed, or attempted to access or otherwise installed on the mobile device), network activity of the public or private network in communication with or accessible by the mobile device, the amount of data sent and/or received from the mobile device, level of certainty of user identity based upon authentication level, etc.

These metrics are monitored in order to detect any substantive changes in the operating environment of the mobile device. For example, measurement and analysis of these metrics may suggest substantive changes in the operating environment that could lead to an increased threat level. The substantive changes could relate to the manner in which the mobile device is being used, who is using it, or network conditions entirely unrelated to the mobile device itself. As one example, if a substantial breach of network security, a widespread virus, or other attack is detected somewhere in a network to which the mobile device has access, the smart container can be essentially shut down the resource and restrict any further access to or from the resource until the substantive change in operating condition or the potential threat is addressed, resolved or determined to be no longer a concern.

At step 306, a substantive change in operating conditions associated with the mobile device is detected or identified. As mentioned above, substantive changes in operating conditions may indicate an increased threat level or conditions of vulnerability for the mobile device, the user of the mobile device (e.g., user data, profile, and/or identity), and/or any network device or resource to which the network device has access to or can gain access to. The measurement of the metrics mentioned above, could lead the security manager 228 to decide in real time to automatically update the smart container, update itself, or issue a different smart container to one or more resources, at step 308. In an alternative embodiment, the smart container itself may include enough intelligence to analyze these metrics and make some real-time decisions to modify itself in order to change the security or access control policies that apply to the resource at any given time. In another embodiment, the automated decision to change or replace the smart container may also be made by, or in conjunction with, a server that is external to the mobile device. For example, a server associated with enterprise 110 may detect a substantive change in operating conditions within the enterprise and automatically determine that the smart container should be modified or replace, in order to implement a different security or access control policy to the one currently in effect.

After the smart container is changed, or replaced with another smart container, the metrics continue to be monitored and may result in the determination that there is another substantive change in the operating conditions, at step 310. For example, a threat that may have been detected at step 306 may now be reduced or eliminated. Thus, a second smart container can be applied to the same particular resource(s) at step 312. This smart container may define security or access control policies that are reduced in order to account for a reduced potential threat. Alternatively, the original smart container may just update itself to apply a new security access control policy.

Those of ordinary skill in the art will appreciate that the examples mentioned above are merely for illustrative purposes. Any other use of otherwise private information may be obtained from service providers and used to identify a user without departing from the scope of the present disclosure.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   monitoring metrics at a mobile computing device;
   identifying a change in operating conditions, based upon the monitored metrics; and
   in response to the change in the operating conditions, automatically applying a smart container to a particular resource of the mobile computing device, the smart container defining an enhanced security access policy;
   wherein the enhanced security access policy increases the level of protection to the particular resource; and
   wherein the metrics comprise a time, a date, a digital signature of the mobile computing device, network activity, a volume of data sent or received from the mobile computing device, a location of the mobile computing device, a location of a remote resource that the mobile computing device is attempting to communicate with, a device IP address, and a level of certainty of user identity based upon an authentication level of the user.

2. The method of claim 1, further comprising selecting the smart container from a plurality of available smart containers, based upon a level of threat associated with the change in the operating conditions.

3. The method of claim 1, wherein the enhanced security policy is selected by the smart container based at least in part upon a level of threat associated with the change in the operating conditions.

4. The method of claim 1, wherein the smart container is further operable to simulate a specific resource type of the particular resource to the operating system, to allow the operating system and the particular resource to continue interacting in the same manner that the operating system and the particular resource would communicate in the absence of the smart container.

5. A computer configured to access a storage device, the computer comprising:
   a hardware processor; and
   a non-transitory, computer-readable storage medium storing computer-readable instructions that when executed by the hardware processor cause the computer to perform:
   monitoring metrics at a mobile computing device;
   identifying a change in operating conditions, based upon the monitored metrics; and
   in response to the change in the operating conditions, automatically applying a smart container to a particular resource of the mobile computing device, the smart container defining an enhanced security access policy;
   wherein the enhanced security access policy increases the level of protection to the particular resource; and
   wherein the metrics comprise a time, a date, a digital signature of the mobile computing device, network activity, a volume of data sent or received from the mobile computing device, a location of the mobile computing device, a location of a remote resource that the mobile computing device is attempting to communicate with, a device IP address, and a level of certainty of user identity based upon an authentication level of the user.

6. The computer of claim 5, wherein the computer-readable instructions further cause the computer to perform selecting the smart container from a plurality of available smart containers, based upon a level of threat associated with the change in the operating conditions.

7. The computer of claim 5, wherein the enhanced security policy is selected by the smart container based at least in part upon a level of threat associated with the change in the operating conditions.

8. The computer of claim 5, wherein the smart container is further operable to simulate a specific resource type of the particular resource to the operating system, to allow the operating system and the particular resource to continue interacting in the same manner that the operating system and the particular resource would communicate in the absence of the smart container.

9. A computer program product, comprising:
   a non-transitory computer-readable storage medium having computer-readable program code embodied therewith, the computer-readable program code comprising:
   computer-readable program code configured to monitor metrics at a mobile computing device; computer-readable program code configured to identify a change in operating conditions, based upon the monitored metrics; and computer-readable program code configured to, in response to the change in the operating conditions, automatically applying a smart container to a particular resource of the mobile computing device, the smart container defining an enhanced security access policy; and wherein the enhanced security access policy increases the level of protection to the particular resource; and wherein the metrics comprise a time, a date, a digital signature of the mobile computing device, network activity, a volume of data sent or received from the mobile computing device, a location of the mobile computing device, a location of a remote resource that the mobile computing device is attempting to communicate with, a device IP address, and a level of certainty of user identity based upon an authentication level of the user.

10. The computer program product of claim 8, wherein the computer readable program code is further configured to select the smart container from a plurality of available smart containers, based upon a level of threat associated with the change in the operating conditions.

11. The computer program product of claim 8, wherein the enhanced security policy is selected by the smart container based at least in part upon a level of threat associated with the change in the operating conditions.

12. The computer program product of claim 8, wherein the smart container is further operable to simulate a specific resource type of the particular resource to the operating system, to allow the operating system and the particular resource to continue interacting in the same manner that the operating system and the particular resource would communicate in the absence of the smart container.

* * * * *